United States Patent [19]

Egnell

[11] 4,193,303
[45] Mar. 18, 1980

[54] LEVEL AND DENSITY-METER

[76] Inventor: Axel Egnell, Kungsgatan 20, 440 30 Marstrand, Sweden

[21] Appl. No.: 878,828

[22] Filed: Feb. 17, 1978

[30] Foreign Application Priority Data

Feb. 17, 1977 [SE] Sweden .............................. 7701740

[51] Int. Cl.² ............................................... G01N 9/28
[52] U.S. Cl. .......................................... 73/438; 73/99
[58] Field of Search ................. 73/438, 447, 299, 301, 73/302

[56] References Cited
U.S. PATENT DOCUMENTS

| | | | |
|---|---|---|---|
| 2,354,847 | 8/1944 | Woodbridge | 73/438 |
| 2,368,616 | 2/1945 | Rosenberger | 73/299 |
| 2,821,857 | 2/1958 | Basilevsky | 73/299 |
| 3,038,336 | 6/1962 | Peters | 73/438 |
| 3,114,381 | 12/1963 | Klose et al. | 73/299 |
| 3,250,123 | 5/1966 | Clayton | 73/301 |

Primary Examiner—Stephen A. Kreitman
Attorney, Agent, or Firm—Holman & Stern

[57] ABSTRACT

This invention relates to a device for measuring the level and the density of a liquid contained in a tank. The device comprises a first pressure-sensitive transmitter close to the bottom of the tank, and two pressure-sensitive transmitters arranged on fixed different levels below the highest permitted liquid level, which two transmitters are compensated for variations of the gas or air pressure in the space above the liquid level. The measurement data from the first transmitter is indicated by a first indicator and the difference of the measurement data from the second and third transmitter is indicated by a second indicator.

9 Claims, 6 Drawing Figures

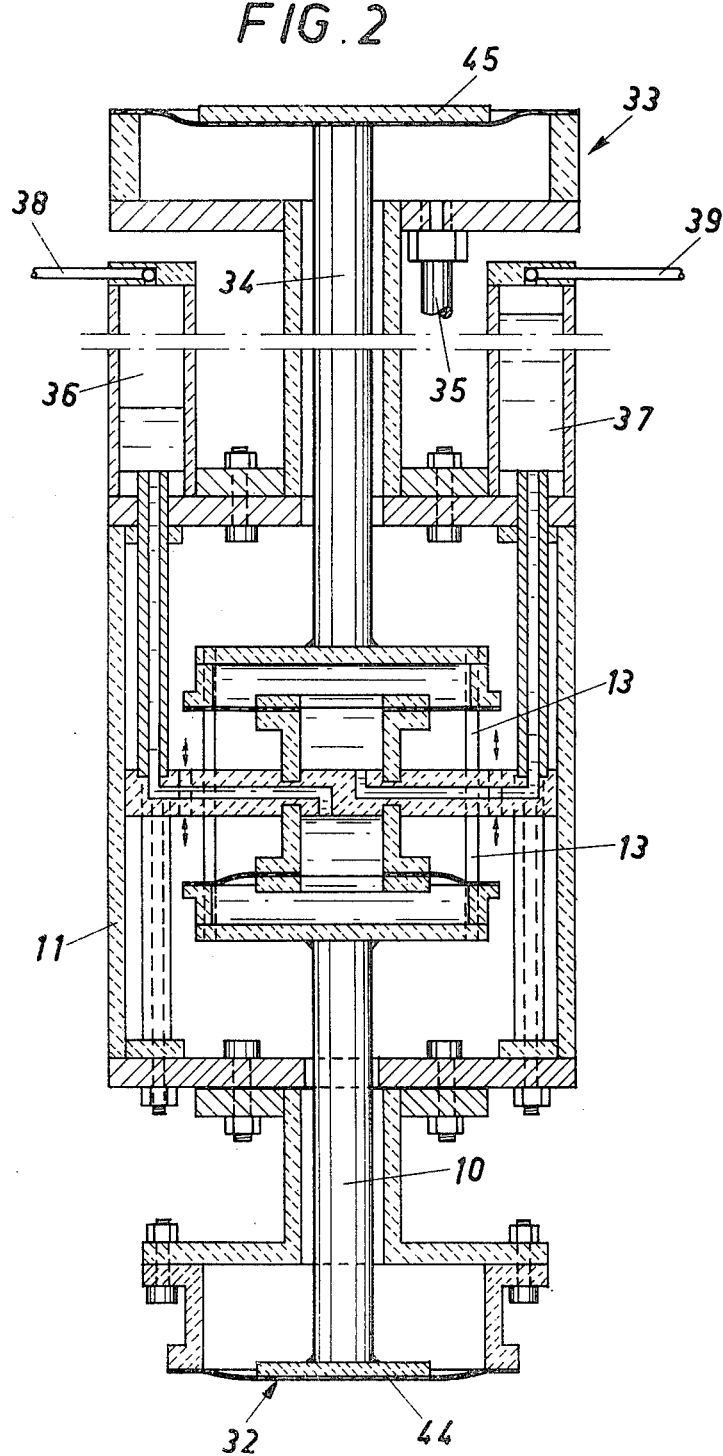

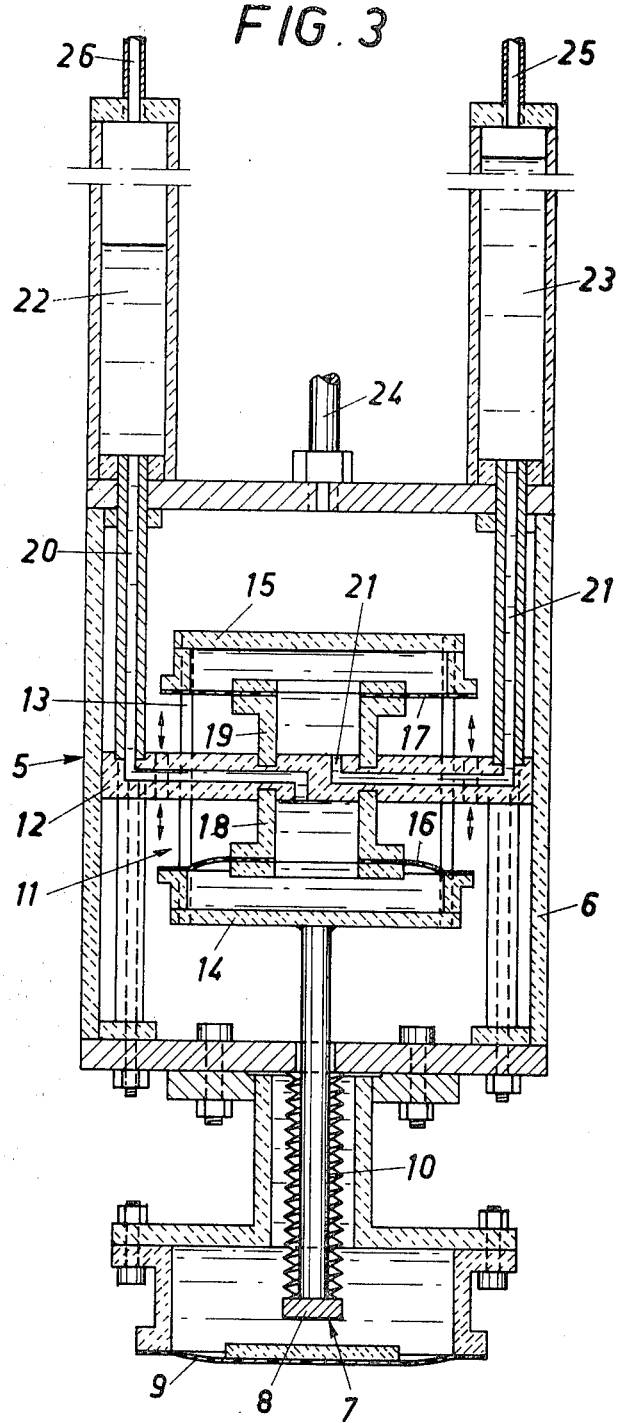

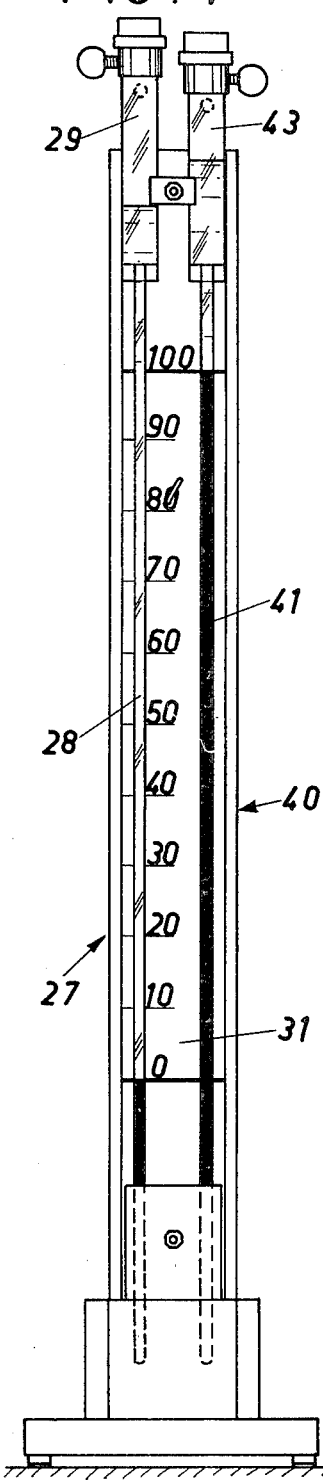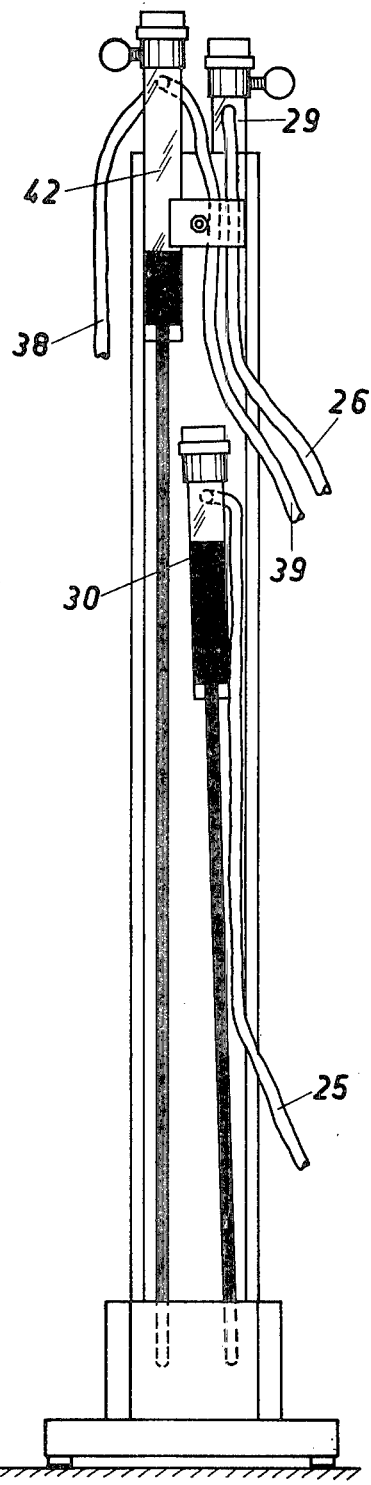

LEVEL AND DENSITY-METER

BACKGROUND OF THE INVENTION

The present invention refers to an arrangement to indicate the liquid level and density in a tank.

Level meters of different kinds are already known, these are however all affected with the disadvantage that they do not take any consideration to the liquid's density or specific weight, and in many cases not either that in the tank prevailing gas or air pressure. The result of this can be that when for example a ship has filled its tanks at a relatively low temperature and is sailing to a warmer climate, the expansion space in the tanks will be filled, and if these spaces have been insufficiently calculated, the liquid will expand and flow over. The reason for wrong calculations of this kind is that the existing pressure sensitive transmitter located near the bottom of tank transmits a measurement result to the indicator that only corresponds to the pressure (the weight) of the liquid column which is stressing the transmitter. Without knowing the specific weight of the liquid one cannot calculate the level of the liquid. When furthermore the specific weight of the liquid is changed through temperature variations and the information from the deliverer regarding the specific weight of the liquid, does not always correspond to the delivered goods, making the calculation of the required degree of expansion even more complicated.

SUMMARY OF THE INVENTION

The purpose of the present invention is to eliminate the above mentioned disadvantages, and to provide an arrangement that is simple in construction and self-acting without any contribution of energy, being therefore 100% explosion and firesafe. This problem has been solved by placing a first pressure-sensitive transmitter close to the bottom of the tank, that a second and a third pressure-sensitive transmitter are placed on different fixed levels below the highest acceptable liquid-level that the transmitters are designed to be compensated for the variations in the gas or air-pressure above the liquid in the tank, that a first indicator or a signal processing unit is arranged to indicate or process the measurement data from the first transmitter and that a second indicator or a signal processing unit is arranged to indicate or process the difference between the measurement data from the second and third transmitter.

BRIEF DESCRIPTION OF THE DRAWINGS

The invention will be further described below with reference to the accompanying drawings, which show two embodiments.

FIG. 2 and 3 are greater scale cross-sectional views through the arrangement's upper respectively lower pressure-sensitive member.

FIG. 4 and 5 are front and rear view of the indicators of the arrangement with indications that correspond to an empty tank.

DETAILED DESCRIPTION OF A PREFERRED EMBODIMENT

Figure 1:
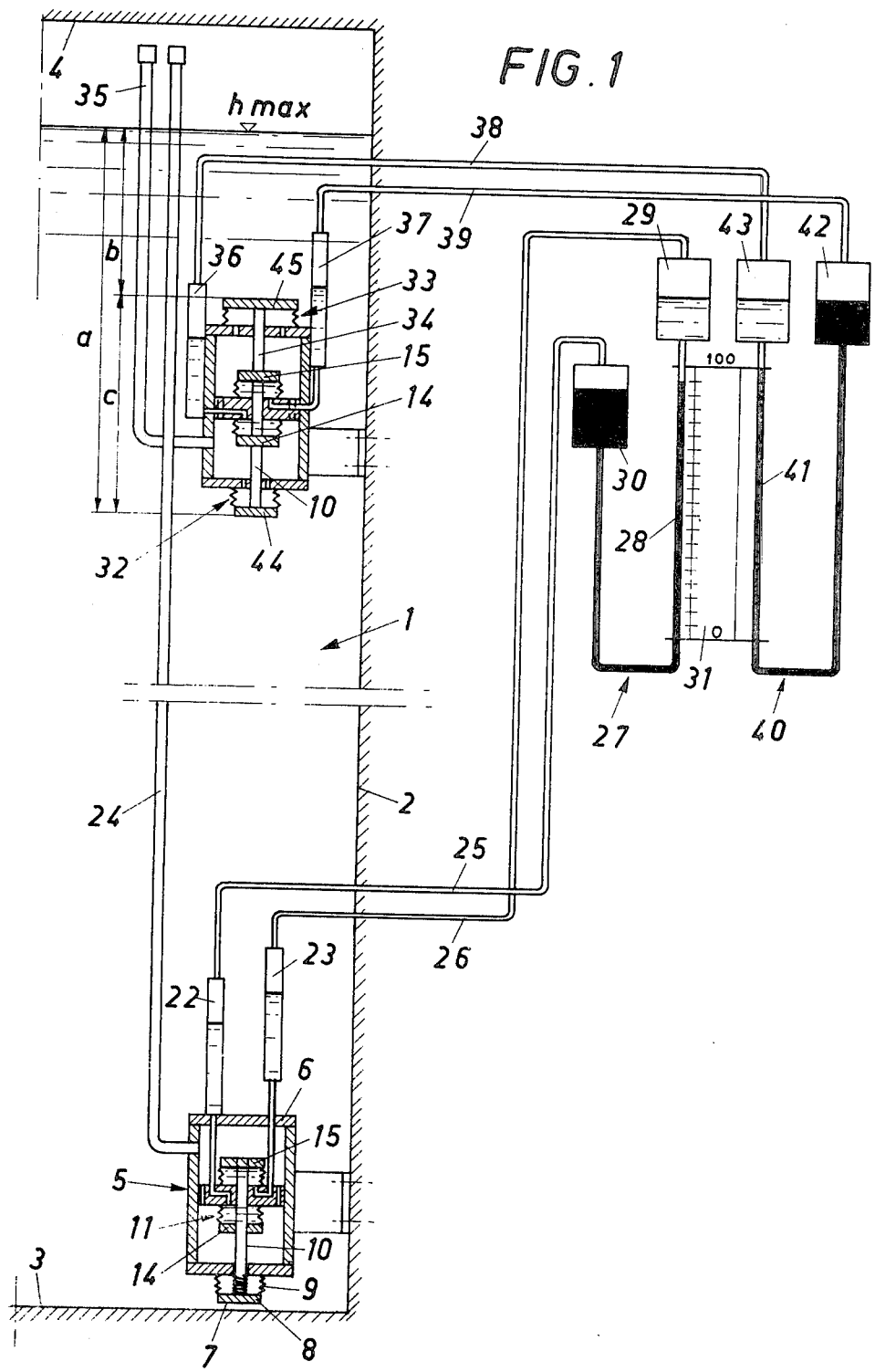
FIG. 1 is a part section schematic of the present invention with the tank filled to the highest permitted level.

In the drawings the numeral 1 denotes a tank, e.g. on a ship, provided with tank walls 2, a tank bottom 3 and a tank top 4. Immediately above the tank bottom 3 a first transmitter 5 is arranged, which comprises a housing 6, to the lower side of which a pressure cell 7 is connected, which is provided with a pressure plate 8 being supported by a bellows 9, said pressure plate 8 is, by means of a rod 10 or similar device, connected to a hydraulically double-acting pressure member 11. Said pressure member 11 comprises pressure cells 14 and 15 connected by rods 13 and located on both sides of a plate 12, which is fixed in the housing. The membranes 16,17 of the pressure cells are by way of distance means 18,19 fixedly connected to the plate 12, in which passages 20,21, are provided that end in a pressure cell each. The passage 20 connects the pressure cell 14 with an ascending pipe 22 arranged on the upper part of the housing and the passage 21 connects the interior of the cell 15 with a second ascending pipe 23. The ascending pipes have a considerably larger cross-section area than the connecting passages 20 and 21. The pressure cell 14, the passage 20 and the ascending pipe 22 as well as the pressure cell 15, the passage 21 and the ascending pipe 23 each provide a hydraulic system, at which the ascending pipes only partly are filled with a hydraulic medium. The interior of the pressure cell 7 communicates with the interior of the housing 6, which by way of a tubing 24 is connected with the space above the highest permitted liquid level $h_{max}$ in the tank. In order to protect the bellows 9 against corrosion, it is encased in an outer pressure cell, which at an exterior pressure affects the pressure plate 8 by a liquid pressure medium.

The two ascending pipes 22 and 23 are at their upper parts each connected to a conduit 25 and 26 resp. to a first indicator 27 comprising a transparent U-shaped tube 28, the free shank ends of which are provided with a liquid box 29 and 30 resp. each. In the U-tube 28 and partly also in the liquid boxes 29 and 30 two non-mixable liquids of different colour are at hand, which form a distinct dividing line between each other. Close to one of the shanks of the U-shaped tube 28 a scale graduated from 0 to 100 is placed.

Thus the transmitter 5 forms a hydropneumatic system connected with the indicator 27, where a change of pressure of the liquid in the tank will affect the pressure cell 7, which by way of the pressure cells 14 and 15 changes the liquid level in the ascending pipes 22,23. The liquid columns in the ascending pipes 22 and 23 act as pistons in a pneumatic system, and the air enclosed in the tubes 25 and 26 transmits a proportional positive or negative pressure to the resp. liquid box 29 and 30, such that the dividing line of the liquid column in the U-shaped measuring tube 28 will be displaced in one direction. The level change in the ascending pipes can be compared to the stroke of a piston and the product of the stroke and the active area of the ascending pipe corresponds to the volume of the stroke of the piston.

In the upper part of the tank and at a fixed distance below the highest permitted liquid level $h_{max}$ in the tank, two transmitters 32 and 33 built together to a unit are arranged with remote pressure surfaces separated by a certain distance c. The transmitters 32 and 33, which in the embodiment shown consist of pressure boxes, are rigidly connected with each other by rods 10,13 and 34. Besides this transmitter unit is constructively designed in the same way as the transmitter 5, and for corresponding constructional details the same numerals have been used. Thus the interior of both the pressure cells 32 and 33 communicates with the interior of the housing 11, which by way of a conduit 35 communicates with the space above the highest permitted liquid level $h_{max}$. The ascending pipes 36 and 37 of the unit are by way of conduits 38 and 39 connected to a second indicator 40, which also comprises a U-shaped transparent measure tube 41, the free shank ends of which are connected to a liquid box 42 and 43 each, which are partly filled with two non-mixable liquids of different colour, at which the dividing line between these forms the indication line. A graduated scale is not required, but the 0 and 100-lines of the scale 31 common for both indicators are the only reading points, which are required for this indicator.

The pressure surfaces 44 and 45 of the transmitters 32 and 33 are so measured that respectively the ratio of the area of said surfaces is inversely proportional to the ratio of the height of the liquid columns acting on the surfaces, i.e., the ratio of the distances a and b respectively from the pressure surfaces to the highest permitted liquid level $h_{max}$. This provides that when the tank 1 is filled with fresh water and this exerts a pressure upon the transmitter 32 the darker liquid column in the U-shaped measure tube of the indicator 40 will force the dividing line from a level right in front of the 100-mark to the 0-mark. The hydropneumatic system is so designed that the displacement of the liquid column in the indicator from the 100- to the 0-mark corresponds to the distance c, i.e., the distance between the pressure surfaces 44 and 45 of the transmitters 32 and 33 respectively. When the liquid level in the tank has risen to the level of the pressure surface 45 of the transmitter 33, this comes into action, and a pressure impulse in the opposite direction is obtained, which involves that the liquid column in the indicator 40 turns at the 0-mark and returns to the 100-mark. The distance b from the pressure surface 45 to the highest permitted liquid level $h_{max}$ has been chosen so, that when the dividing line in the indicator 40 has reached the 100-mark the highest permitted liquid level in the tank is reached. If the tank now is filled with e.g. diesel oil or sea water, the liquid column in the indicator 40 will turn over resp. under the 0-mark which however is unimportant since only the 100-mark is necessary to indicate the liquid level indication at $h_{max}$. During the whole measuring course both transmitters 32 and 33 are affected by the gas- or air pressure in the space above the liquid level, which requires that a pressure compensatioin takes place, i.e., that the measure deflection is not improperly affected by varying air- or gas pressures above the liquid in the tank.

In order not to have the weight of the different construction members of the transmitter as pressure plates, connection rods etc. affecting the measure result, the liquid pressure from the ascending pipe 23 and 37 on the pressure box 15 is somewhat higher than the corresponding liquid pressure from the ascending pipe 22 and 36 resp. at which a balance is obtained.

The dimensioning of the arrangement so that it fits to a given tank height is made by choosing an appropriate pressure surface on the transmitter 5, at which a fine adjustment can be made by placing displacement bodies, e.g. prismatic rods, in the ascending pipes. Thereby an increase of the stroke of the liquid pistons is obtained, but the desired stroke volume is maintained.

Since the signal transmission medium between the transmitters and the indicators is air of atmospheric pressure the measuring process is self-acting, and hydropneumatic with a high exactness. Because that the liquid columns of the indicators have a supply as well as a discharge conduit, the measurement results are independent of temperature variations.

The device according to FIG. 1–5 works in the following way.

Concurrently with that the tank is filled with liquid, e.g. oil, the transmitter 5 will provide to a gradually increasing pressure which affects the indicator 27, in which the darker liquid column rises from the 0-mark and upwards. When the liquid has reached the transmitter 32 this will be exerted to pressure, and if e.g. the distance between the transmitters 32 and 33 amounts to 0.5 m and the distance from the pressure surface 44 of the transmitter 32 to the highest permitted liquid level amounts to 1 m, the refuelling of the tank can be made exactly to this level owing to that the measuring course of the indicator 40 can be observed during the last meter of the refuelling. The refuelling is stopped when the liquid column of the reading shank of the indicator has completed its measurement cycle from the 100-mark to the 0-mark, and has returned to the 100-mark. In this position the specific weight of the liquid can be read on the second indicator 27, and in the example shown (FIG. 1) the specific weight is 0.95, since the liquid column in the shank 28 has stopped at the value 95.

Thus with the apparatus shown and described the highest permitted level of the liquid in the tank can be read on the indicator 40 independent of the specific weight of the liquid, which at the same time is obtained through the indicator 27. By means of the bearing tables made by the ship manufacturer, which are made for each tank and which for this purpose must be noted in percentage of the height, the weight and volume of the tank content can easily be calculated.

Figure 6:
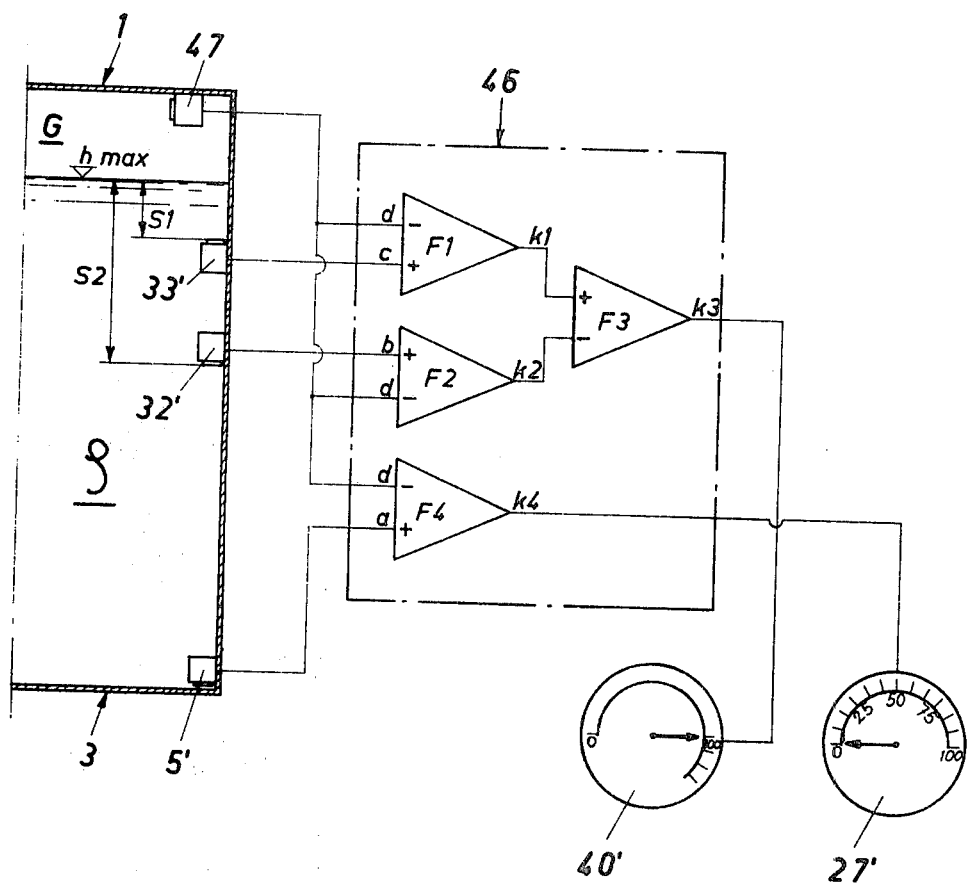
FIG. 6 is a part section schematic of an electronic embodiment of the invention.

As can be seen from FIG. 6 an electronic or a combined hydropneumatic- electronic device can be used in such cases where the explosion risk is very small or negligible. In this embodiment either the transmitters according to the previous example or conventional electronic pressure transmitters can be used, e.g. inductive, capacitive or piezo- electric transmitters. In the example shown electronic transmitters are concerned, of which a first pressure transmitter 5' is arranged at or close to the bottom 3 of the tank, a second pressure transmitter 32' is arranged at the distance $S_2$ below the highest permitted liquid level $h_{max}$, a third pressure transmitter 33' at the distance $S_1$ below the highest permitted liquid level $h_{max}$, and a fourth pressure transmitter 47 at or close to the top of the tank above the liquid level. All pressure transmitters are arranged to deliver electric signals a,b,c and d to an electronic measurement data converter 46, and which signals are proportional to the ambient pressure of the respective pressure transmitter. The output d of the pressure transmitter 47 is then proportional to the atmospheric or gas pressure G in the tank 1, which thus acts upon the liquid surface: further the signals c,b and a of the pressure transmitters 33', 32' and 5 are proportional to the liquid height above the respective pressure transmitter, to the density of the liquid and to the atmospheric- or gas pressure in the tank, which affects the liquid surface or which directly affects the pressure transmitters when the liquid level is not affecting them.

The measurement data converter 46 according to this embodiment consists of difference amplifiers, of which a first difference amplifier $F_1$ is arranged to receive the signals d and c from the respective pressure transmitter 47 and 33' and to subtract the signal d from the signal c, at which a compensation for the atmospheric - or the gas pressure G in the tank is obtained, and to amplify the difference signal with a factor $f_1$ at which an output $k_1$ is obtained. A second difference amplifier $F_2$ is arranged to receive the signals b and d from the respective pressure transmitter 32 and 47, at which the signal d is subtracted from the signal b, so that a compensation for the atmospheric or the gas pressure G in the tank is obtained, and the difference signal is then amplified with a factor $f_2$, which gives the output $k_2$. The signals $k_1$ and $k_2$ can now be written as $k_1=f_1$ (c-d) and $k_2=f_2$ (b-d). If d=G, c=$S_1$+G and b=$S_2$+G are inserted in the resp. equation, $k_1=f_1$ ($S_1$+G-G) and $k_2=f_2$ ($S_2$+G-G) are obtained. If the maximum liquid level shall be indicated independent of the density of the liquid the amplifying factors $f_1$ and $f_2$ are so chosen that the outputs $k_1$ and $k_2$ are equal when the liquid has reached the determined maximum level. If $k_1=k_2$ follows $f_1(S_1+G-G)=f_2(S_2+G-G)$, which involves $f_1=f_2 S_2/S_1$.

Thus the amplifying factor $f_1$ shall be a constant $S_2/S_1 f_2$. The signals $k_1$ and $k_2$ affect a third difference amplifier $F_3$, in which the signal $k_2$ is subtracted from the signal $k_1$, the occurring difference is amplified to a signal $k_3$, which is delivered to a first indication device 40' of either analog or digital type.

When the tank 1 is empty the indication device 40' shows an initial value 100. If the tank is filled and the liquid level reaches the pressure transmitters 32' the measuring deflection on the indication device will fall to the 0-value. When the liquid level reaches the pressure transmitter 33' the measuring deflection turns and then the 100-value again is indicated the highest permitted liquid level $h_{max}$ has been reached and the filling of the tank 1 is completed.

The pressure transmitter 5' which is arranged at the bottom of the tank, delivers a signal a to a fourth difference amplifier $F_4$ in the measurement data converter 46. The output $k_4$ from the difference amplifier $F_4$ consists of the signal d subtracted from the signal a, at which a compensation for the atmospheric or the gas pressure in the tank is obtained and is thereafter amplified with a factor $f_4$, which is chosen so that the measuring deflection in a second indication device 27' of digital or analog type indicates the specific weight of the filled liquid. If desired the signal $k_4$, which corresponds to the specific weight of the liquid, can be delivered to a further signal processing member (not shown), where for different liquid levels the value which corresponds to the measured volume of the tank can be added, which data are available in the bearing table made by the ship manufacturer. An indicator graduated in weight units, e.g. tons, connected to this signal processing member, will thus indicate the weight in tons for different predetermined liquid levels.

Thanks to the invention the filling of the tank can be interrupted exactly at a pre-determined level independent of the density of the liquid and fluctuations of the liquid level close to the maximum level, e.g. owing to heat influence and thereby caused density changes, can also easily be indicated. An alarm unit can also be connected and warn when the maximum level of some reason is exceeded. Further the invention can provide an exact indication of the total weight of the liquid, either by means of the bearing table or as mentioned above directly from a further indication device.

The electronic transmitters can appropriately be arranged so that their pressure sensing surfaces are situated substantially perpendicular, so that possible adhering oil residues or similar do not affect the measurement result. If an oil residue would adhere to the hydraulic transmitters such an increase of weight can be compensated in a very simple way by opening aeration screws at the liquid boxes of the indicators.

The invention is not limited to the embodiments described and shown, but a plurality of variations are possible. Thus for example the hydraulic transmitters can be used together with the electronic indication devices.

I claim:

1. An apparatus for indicating the liquid level and density of a liquid in a tank, said apparatus comprising:
   a first pressure-sensitive transmitter placed at or close to the bottom of the tank;
   second and third pressure-sensitive transmitters placed at different fixed distances below a highest permitted liquid level, said transmitters including means for compensating for variations in gas pressure in the tank;
   first indicator means, responsive to said first pressure-sensitive transmitter, for indicating the density of said liquid when said highest permitted liquid level is reached;
   means for converting the pressure upon each of said second and third pressure-sensitive transmitters into signals, said means for converting having conversion factors with the ratio of said conversion factors the inverse of the ratio of the distances from the respective transmitters to the highest permitted liquid level; and
   a second indicator means, indicating the difference between said signals from said second and third transmitters, for providing an indication of when the highest permitted liquid level is approached.

2. An apparatus as claimed in claim 1, wherein, the first transmitter comprises a double-acting piston, pressure cell or similar enclosed in a housing the piston rod or similar of said piston or pressure cell is cooperating with a pressure surface sensing the liquid pressure in the tank, and that the interior of the housing and the inside of the pressure surface are affected by the gas-or air pressure in the space above the liquid level.

3. The apparatus of claim 1 wherein in order to provide said conversion factors, said means for converting comprises different surface areas on each of said second and third transmitters with the ratio of the area of said second transmitter over the area of said third transmitter being the inverse of the ratio of the distance of said second transmitter from said highest permitted liquid level over the distance of said third transmitter from said highest permitted liquid level.

4. An apparatus as claimed in claim 3, wherein the second and the third transmitters consist of a unit comprising a double-acting piston, pressure cell or similar enclosed in a housing the through piston rod or similar of said piston or pressure cell is with one end cooperating with a lower pressure surface sensing the liquid pressure in the tank and is with its opposite end cooperating with an upper pressure surface or similar sensing the liquid pressure in the tank, that the interior of the housing and the insides of the pressure surfaces are affected by the gas- or air pressure in the space above the liquid level.

5. An apparatus as claimed in claim 2 or 4, wherein the positive and negative chambers of the double-acting piston or pressure cell of the transmitters are each connected to an ascending pipe the stroke and stroke of volume of which is adjustable e.g. by deplacement bodies being placed in the ascending pipes.

6. An apparatus as claimed in claim 3, wherein each transmit by way of conduits for a pneumatic medium is connected to an indicator each, comprising a U-shaped transparent tube the free shank ends of which are each connected to a liquid box and that the transparent tubes and partly also the liquid boxes are filled with two non-mixable liquids of different colour, so that a distinct dividing line is formed between said liquids, said dividing line indicating the specific weight of the liquid to the first indicator at full liquid level and the highest permitted liquid level in the tank to the second indicator.

7. The apparatus of claim 1, wherein said transmitters emit electronic signals and in order to provide said conversion factors, said means for converting comprises amplifiers associated with said second and third transmitters, the ratio of amplification of the second amplifier associated with said second transmitter over the amplification of the amplifier associated with said third transmitter is the inverse of the ratio of the distance of said second transmitter from said highest permitted liquid level over the distance of said third transmitter from said highest permitted liquid level.

8. An apparatus as claimed in claim 7, wherein the measurement data from the transmitters which are located at fixed distances from the liquid level are processed in difference amplifiers that a measurement data received from a transmitter located below the top of the tank above the highest permitted liquid level is subtracted from said measurement data that the signals $k_1$ and $k_2$ obtained in said amplifiers are amplified with a factor $f_1$ and $f_2$, where $f_1$ is the quotient of the distances $S2/S1$, which signals $k_1$ and $k_2$ are delivered to a third difference amplifier in which the signal $k_2$ is subtracted from the signal $k_1$ and that the signal corresponding to this difference is delivered to an indication device.

9. An apparatus as claimed in claim 8, wherein the measurement datum a from the transmitter located at the bottom of the tank is delivered to an amplifier where the measurement datum d from a transmitter located below the top of the tank is subtracted from the measurement datum a and is amplified with a factor $f_4$ and indicated in a second indication device.

* * * * *